(12) United States Patent
Bello Larroche

(10) Patent No.: US 11,221,086 B2
(45) Date of Patent: Jan. 11, 2022

(54) TAP CARTRIDGE WITH CABLE ROUTING FOR MANUAL MOVING ACTUATION HANDLE AND TAP WITH ELECTRONIC HANDLE THAT CONTAINS SAID TAP CARTRIDGE

(71) Applicant: SEDAL, S.L.U., Sant Andreu de la Barca (ES)

(72) Inventor: Rafael Bello Larroche, Martorell (ES)

(73) Assignee: SEDAL, S.L.U., Sant Andreu de la Barca (ES)

( * ) Notice: Subject to any disclaimer, the term of this patent is extended or adjusted under 35 U.S.C. 154(b) by 0 days.

(21) Appl. No.: 16/713,133

(22) Filed: Dec. 13, 2019

(65) Prior Publication Data

US 2020/0191294 A1    Jun. 18, 2020

(30) Foreign Application Priority Data

Dec. 13, 2018   (ES) .............................. ES201831204

(51) Int. Cl.
| | | |
|---|---|---|
| *E03C 1/05* | (2006.01) | |
| *H01R 35/02* | (2006.01) | |
| *F16K 11/078* | (2006.01) | |
| *F16K 31/02* | (2006.01) | |
| *F16K 11/00* | (2006.01) | |

(Continued)

(52) U.S. Cl.
CPC .............. *F16K 31/02* (2013.01); *E03C 1/055* (2013.01); *F16K 19/006* (2013.01); *F16K 27/00* (2013.01); *F16K 31/605* (2013.01); *H01R 35/025* (2013.01); *H02G 11/00* (2013.01); *F16K 11/0782* (2013.01)

(58) Field of Classification Search
CPC .... F16K 19/006; F16K 11/22; F16K 11/0782; F16K 31/041; F16K 31/605; E03C 1/05; E03C 1/055; F15B 13/0875; H01R 35/025
See application file for complete search history.

(56) References Cited

U.S. PATENT DOCUMENTS 5,243,717 A  *  9/1993  Yasuo ..................... F16K 31/02
                                                251/129.04
5,586,746 A  *  12/1996  Humpert ................. E03C 1/057
                                                251/129.04

(Continued)

FOREIGN PATENT DOCUMENTS

DE         9208372 U1    9/1992
DE    102005061031 A1 *  6/2007  ............. E03C 1/055
(Continued)

OTHER PUBLICATIONS

Spanish Patent Office; Spanish State of Art Report for Spanish Patent Application No. 201831204; Oct. 30, 2019.

*Primary Examiner* — Matthew W Jellett
(74) *Attorney, Agent, or Firm* — Thomas E. Lees, LLC

(57) ABSTRACT

The present invention relates to a tap cartridge that includes a routing of a cable that may transmit data and/or supply electricity, for a tap handle or lever with electronic functions, and which also relates to the tap containing said cartridge with the routing system, wherein the configuration of a parameter of the fluid supplied is performed by rotation of said handle or lever, all thanks to a positioning through the inner cartridge and of an extra accumulation of cable in a space of the cartridge prior to the connection of the lever.

8 Claims, 3 Drawing Sheets

(51) Int. Cl.
   *F16K 31/60*   (2006.01)
   *F16K 27/00*   (2006.01)
   *H02G 11/00*   (2006.01)

(56) References Cited

U.S. PATENT DOCUMENTS

| | | | | |
|---|---|---|---|---|
| 5,618,023 | A * | 4/1997 | Eichholz | E03C 1/057 |
| | | | | 251/129.04 |
| 6,003,170 | A * | 12/1999 | Humpert | E03C 1/057 |
| | | | | 251/129.03 |
| 6,341,389 | B2 * | 1/2002 | Philipps-Liebich | E03C 1/05 |
| | | | | 251/129.04 |
| 6,363,549 | B2 * | 4/2002 | Humpert | E03C 1/05 |
| | | | | 251/129.03 |
| 6,390,125 | B2 * | 5/2002 | Pawelzik | F16K 11/0782 |
| | | | | 137/605 |
| 6,425,415 | B2 * | 7/2002 | Lorenzelli | E03C 1/05 |
| | | | | 137/624.11 |
| 6,435,212 | B2 * | 8/2002 | Brandebusemeyer | |
| | | | | E03C 1/0404 |
| | | | | 137/615 |
| 6,457,191 | B2 * | 10/2002 | Brandebusemeyer | E03C 1/04 |
| | | | | 137/597 |
| 7,156,363 | B2 * | 1/2007 | Parsons | E03C 1/057 |
| | | | | 251/129.06 |
| 9,062,790 | B2 * | 6/2015 | Esche | F16K 31/02 |
| 9,074,698 | B2 * | 7/2015 | Esche | F16K 37/0041 |
| 9,085,879 | B2 * | 7/2015 | Mielke | F16K 31/08 |
| 9,170,148 | B2 * | 10/2015 | Bayley | G01F 23/363 |
| 10,351,199 | B2 * | 7/2019 | Osanai | B62J 33/00 |
| 10,617,072 | B2 * | 4/2020 | Ware | F16K 27/048 |
| 2020/0248823 | A1 * | 8/2020 | Recio Fernandez | F16K 27/044 |

FOREIGN PATENT DOCUMENTS

| | | |
|---|---|---|
| DE | 102005061031 A1 | 6/2007 |
| EP | 0831260 A2 | 3/1998 |
| EP | 1700957 A2 | 9/2006 |
| ES | 2219443 T3 | 12/2004 |
| JP | 2003311673 A | 11/2003 |

* cited by examiner

TAP CARTRIDGE WITH CABLE ROUTING FOR MANUAL MOVING ACTUATION HANDLE AND TAP WITH ELECTRONIC HANDLE THAT CONTAINS SAID TAP CARTRIDGE

CROSS-REFERENCE TO RELATED APPLICATIONS

This application claims the benefit of Spanish Patent Application No. P201831204, filed Dec. 13, 2018, entitled "TAP CARTRIDGE WITH CABLE ROUTING FOR MANUAL MOVING ACTUATION HANDLE AND TAP WITH ELECTRONIC HANDLE THAT CONTAINS SAID TAP CARTRIDGE", the disclosure of which is hereby incorporated by reference.

The present invention relates to a tap cartridge that includes a routing of a cable that may transmit data and/or supply electricity, for its handle or lever, and it also relates to the tap containing said cartridge with the routing system, wherein the configuration of a parameter of the fluid supplied is performed by a manual actuation movement on said handle or lever.

BACKGROUND

Taps which allow regulation by electronic means of the supply parameters of the fluids that circulate through them are known within the kind of taps with electronic functions.

Similarly, taps with display means of said characteristic regulation parameters for the user are also known, such as temperature, timing time or flow, or simply lighting or signals with a particular colour.

These means of electronic regulation, control and configuration, and the display means, can be located outside of the tap, by way of auxiliary panels, or on the tap itself, choosing static areas to be able to have both the possible electronic control and configuration means, and also the possible display means that allow showing data and/or viewing indications in said means.

In the taps that incorporate designs of handles with electronic elements included, the user's interaction with these electronic elements is typically performed through fixed buttons or, if there are rotating handles, they have independent movement with respect to said electronic means both of control and configuration and of display, without the tap having a handle of manual moving actuation with electronic elements solidly joined to said moving handle.

The electric power supply and/or data supply to said handles or levers of electronic configuration is typically performed thanks to a cable with one or more wires that communicates the handle or lever with the processing means that receive the instructions given by the user in the electronic handle or lever and send the signals and/or indications to be visually shown thereto.

Considering the static nature of the assembly, these cables perform the direct communication in a certain trajectory with no further requirements than the tightness of the cables with respect to the fluids they transport, where said designs try to minimize the length of said cables to have no costs other than those necessary and simplify the cable routing.

SUMMARY OF THE INVENTION

The objective of the present invention is to provide a tap cartridge with cable routing for manual moving actuation handle and tap with electronic control that contains said tap cartridge, which achieves the configuration of a novel and advantageous product, having the advantages and resolving drawbacks of the state of the art that will be described below.

In accordance with this objective, according to a first aspect, the present invention provides a tap cartridge with cable routing for manual moving actuation handle, whereto is coupled a rotating tap handle or lever with electronic functions of control, configuration, display and/or generation of acoustic signals.

This cartridge is characterized in that it has at least one routing formed by cable guiding passages, to carry it from the inlet or starting connection of said cable in the cartridge, to its connection in the handle or lever of the tap that contains said cartridge. The routing has a passage that traverses the cartridge until an area close to the coupling of the handle or lever, wherein there is accumulation space of additional length of cable in this area, with the accumulation configured in spiral form within said space, before its connection to the electronic elements of the handle or lever.

This space, provided for the accumulation of additional length of cable in spiral form, is sufficient to contain said additional length of cable in spiral form, so that the contraction or expansion produced by the variation in the number of coil turns in the spiral, due to the pulling of the cable at the end of the handle or lever, in its rotation does not press each turn of the cable on the adjacent ones or against the inner and/or outer limits of the space where it is found.

This configuration achieves the connection by means of cable from the inside of the tap, of the cartridge specifically, to the handle or lever of manual moving actuation, wherein means of configuration, control, display and/or generation of acoustic signals are found, which displace solidly joined with the configuration or manual control movement, guaranteeing that said connection absorbs, in a controlled and predictable manner, the variation in the position and length of cable necessary for the connection between said means and the static elements of the tap, whilst the configuration or control movement occurs. It also achieves that advantageously, as it has a cable layout in spiral form with separation between each one of the cable turns that form it, clamping does not occur therein, tangling, etc., as the diameter of said wound cable spiral, and said separation between the cable turns, adapts to the available length of cable in the spiral according to the length released or collected during the movement of the handle or lever.

The additional length of cable is the same as or greater than the length necessary to cover the displacement length of the handle or lever.

Routing of a cable is understood, in the present specification of the invention, as the configuration of the layout of a cable, its passages, fixings and possible auxiliary elements that allow conveying a cable in a controlled and guided manner from its origin to its destination.

In a possible embodiment of the invention, the passage that the cable follows that traverses the cartridge is performed over the outside of the cartridge in a channelled manner. Alternatively, in another possible embodiment, the passage that follows the cable that traverses the cartridge is performed, at least partly, through the inside of the cartridge.

This also allows having several alternative configurations of cable passage, preserving at all times the water-tightness of said passages with respect to the areas of the cartridge and of the tap with the fluid, whether by means of recesses or notches through the outside of the cartridge, or by means of channelling through its inside or outside.

Optionally, said cable passages that traverse the cartridge performed through the outside of the cartridge are performed through a protective encapsulation or, alternatively, said cable passages through the outside of the cartridge can be performed by an open channel with retention elements of the cable position.

As another possible option of the invention, prior to the formation of the accumulation of additional length of cable in spiral form, the routing has retention means of a point of the cable in that position, fixing the length of the segment prior to said spiral, whilst after said accumulation of additional length of cable in spiral form, there is fixing means of the cable solidly joined to the rotation element of the handle or lever, so that they perform the rotation with said handle or lever.

Preferably, the retention of the cable in its routing prior to the accumulation space, can be performed whether by means of the actual securing points and passages towards the inside of the accumulation space, without the need to have a specific prior retention means of the cable, and by means of a specific auxiliary retention means for said prior retention action.

This previous layout of fixing points prior to the accumulation of additional length of cable in spiral form achieves that said spiral does not lose part of its length, as it avoids that segments of this accumulation in spiral form displace to areas outside the designed space so that it performs its contraction and expansion movements according to the movement of the handle or lever whereto it is connected and which it pulls. Also, with respect to the layout of the fixing points after the accumulation of additional length of cable in spiral form, thanks to fixing means solidly joined to the movement of the handle or lever, it manages to avoid a possible return of the cable to the spiral, and an effective pulling.

Also optionally, once the fixing is performed after the accumulation spiral and before the connection to the handle, a multiple folding is performed in the cable to have a second extra length in the possible displacement in the inclination plane of the lever and of its connection point with respect to the outlet point of the cable of the spiral. This option allows covering movements of the handle or lever in said displacements in the vertical plane without having to alter the plane of the cable accumulation spiral which, if said second extra length was not provided, would have to adapt to an inclination movement that could create superimpositions of the segments of the spiral and the possible cable entrapment.

The cable that can be used, and which is the object of the routing, may be of flat multi-wired type or of circular section, and said cable may have, for example and preferably, data transfer and/or electric power supply. In this way, it manages to include in this layout all the types of cable that due to size can be included inside the tap to perform said data transmission and/or electric power supply functions.

Preferably, in the configuration of the invention, said cable starts from an inner processing means in the cartridge. This inner processing means typically includes the circuit board that programs the electronic functions, receives the instructions sent by the interaction of the handle or lever with the user and/or sends the signals and/or data to said handle or lever for the viewing by the user.

Alternatively, the cable starts from an outer element of the cartridge, having in this option a configuration wherein the information and its processing, and the electric power supply, come from means located outside of the cartridge, but where the cable that transmits it has to go through the tap cartridge to reach the connection area with the handle or lever.

Optionally, it is possible to have the cable with its position fixed to the mixing cartridge by means of adhesive or similar in, at least, fixed routing segments which do not correspond to the accumulation in spiral form, achieving a layout which, in addition to having fixed the position of the cable specifically and prior to the creation of the cable accumulation spiral, have fixed route segments, so that the cable cannot come out of said position, avoiding movements that may create friction and damage in the cable and possible stresses.

It is also an object of the present invention, as a second aspect thereof, to provide a tap with electronic handle containing a tap cartridge with routing such as that indicated above, wherein said tap has electronic functions of control, configuration, display and/or acoustic signals at least in the handle or lever which is of manual and rotating actuation.

This achieves a tap which allows a configuration different to what is usual in the state of the art for said electronic taps, allowing the connection from the inside of the cartridge to a handle or lever which has regulation or configuration movement of manual actuation by the user with a controlled guiding of the cable, without creating stresses or may deteriorate the connection cable by said regulation or configuration movements that imitate those performed in the typical mechanical regulation taps by the user.

Optionally in this indicated tap, the water mixing system is a mechanical system, and the handle can be used as signal display element or mere lighting of the handle or lever.

In an alternative embodiment, the water mixing system may be an electronic system inside the body of the tap, whilst alternatively, the water mixing system may be an electronic system outside the tap.

This achieves a cartridge and a tap that contains said cartridge with a cable routing system with a communication and/or electric power supply cable to the handle or lever of said tap, where the handle or lever may have lighting elements, signal and/or data display, acoustic elements and/or electronic configuration and regulation means, said handle or lever having movement whereto said elements follow solidly joined, without the cable suffering stresses or being deteriorated to accompany in the movement to the electronic or electrical consumption elements which are installed in the handle or lever.

Hence, a cartridge is also created which, maintaining the geometry of the typical tap, as said cartridge has dimensions assimilable with those of a typical tap mechanical mixing cartridge, allows providing the designs of existing systems of said taps with classic cartridge or valve, with a cable routing through spaces comprised by the new cartridge, to be able to couple new electronic handles with new functionalities that the classic handle tap does not have.

BRIEF DESCRIPTION OF THE SEVERAL VIEWS OF THE DRAWINGS

For a better understanding of all the aforementioned, drawings are attached wherein, schematically and only by way of non-limiting example, practical embodiments are represented.

DETAILED DESCRIPTION OF THE INVENTION

Figure 1:
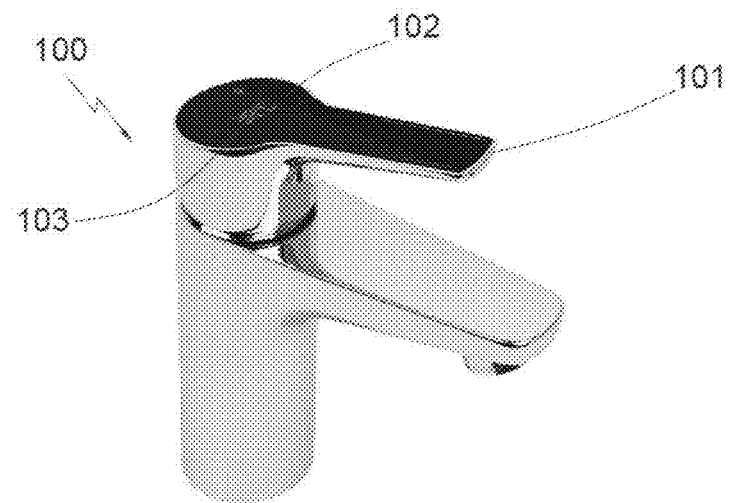
FIG. 1 is a perspective view of a single-lever tap with moving regulation handle with display of options, parameters and electronic regulation configuration-interface.
Figure 2:
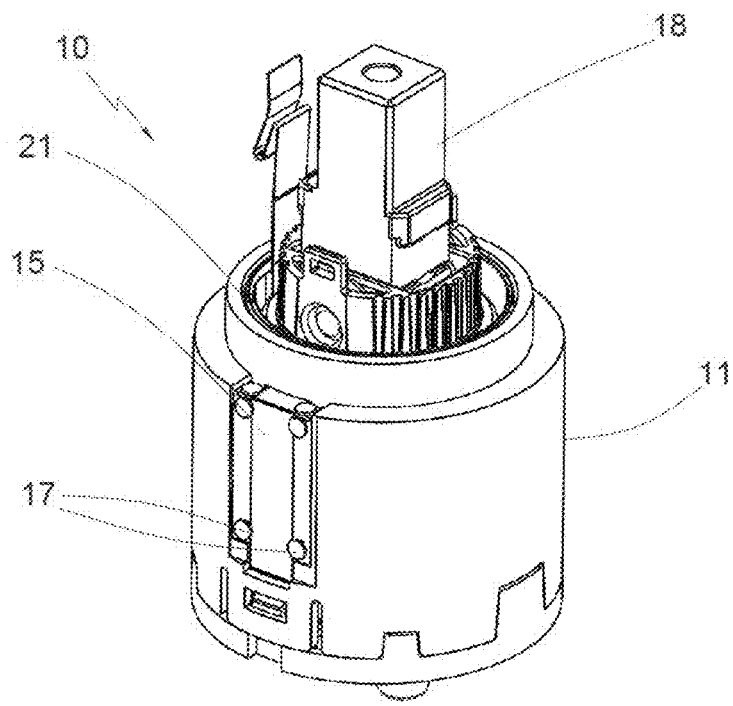
FIG. 2 is a perspective view of the inner cartridge of the tap whereto the handle of said tap is connected in its cam.
Figure 3:
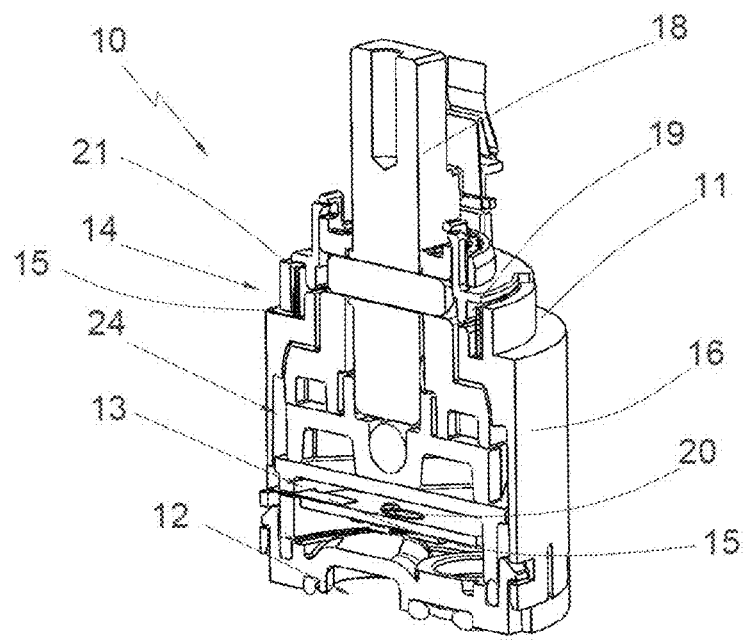
FIG. 3 is a sectional view of the inner cartridge through the area of routing that traverses said cartridge over its outside.
Figure 4:
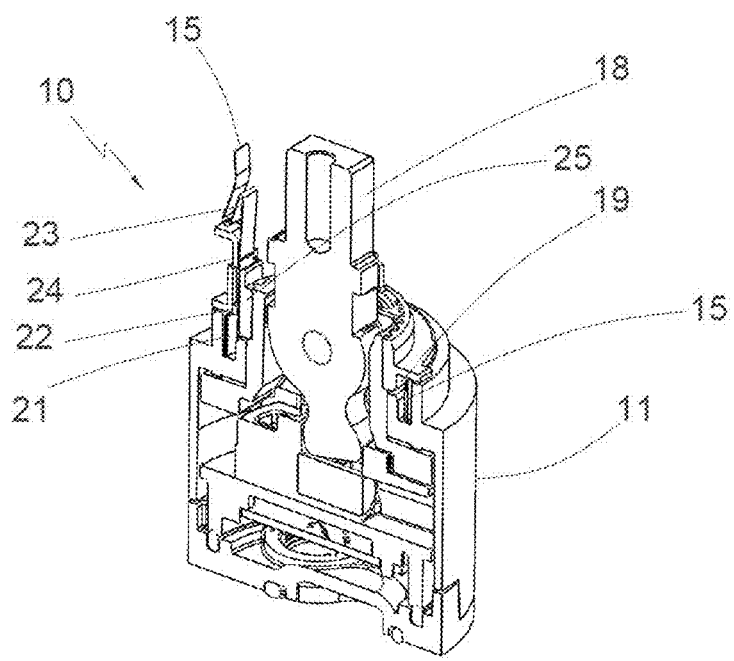
FIG. 4 is a sectional view of the inner cartridge through the area of routing that connects with the tap handle with a prior folding to cover the inclination movement of the handle.
Figure 5:
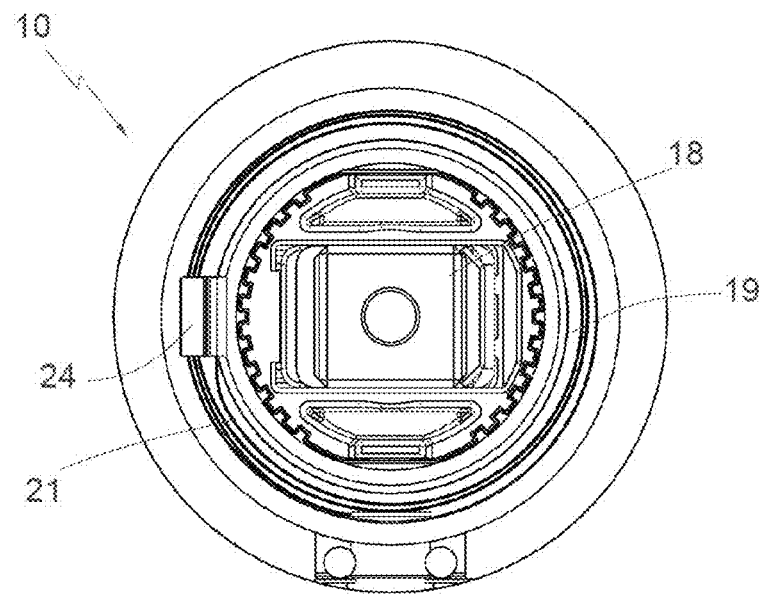
FIG. 5 is a top plan view of the cartridge where it is possible to observe the cable accumulation space in spiral form.
Figure 6:
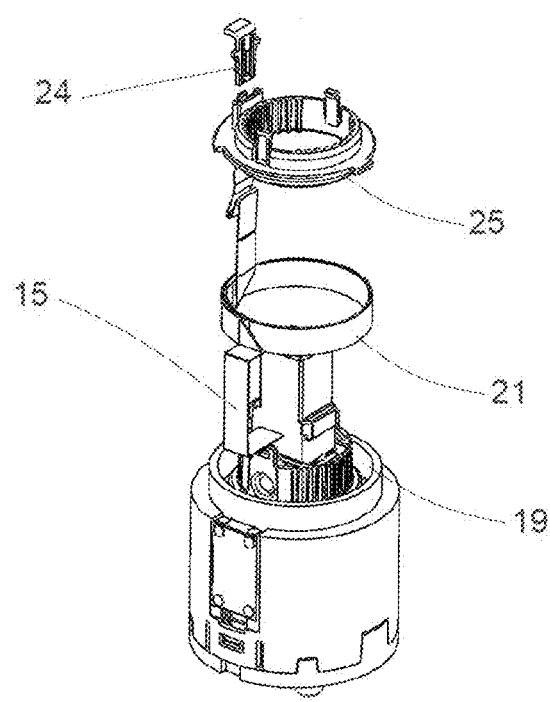
FIG. 6 is a partially exploded view to be able to view the route of the cable routing.

In the present preferred embodiment of the invention, as can be seen in FIG. 1, a mixer water tap (100) of single-lever type (101) with manual regulation by means of the movement of the lever in rotation displacements of said lever and in inclination change movements thereof in the vertical plane, said lever (101) having display means (102) and touch configuration means (103) in the upper part thereof (101) which allow the user to know the different characteristic parameters of the water supplied, in addition to being able to vary them or choose a regulation or function associated to the characteristics of the water to supply or the manner of performing it.

This tap (100) has an electronic mixing system external to the tap (100) so that for the adaptation of the assembly to the tap (100), the connection of the lever (101) and detection of the different regulation positions of said lever (101), there is a cartridge (10) mounted inside that receives the supply of externally mixed water to carry it to the spout, and it has processing means (20) that manages the reception of the configuration parameters performed by the user in the touch means (103), the display of data in said display means (102), the electricmpower supply to the previous means (102, 103) and the communication with the external mixing system, not represented in the figures.

As shown in FIGS. 2 to 6, the cartridge (10) mounted inside the tap (100) is formed by a body (11) which in its base has the water conveyance area (12), the area (13) where the processing means (20) are located, the detection area (24) of the lever (101) position, and the upper area (14) of the cartridge (10) where the connection cam (18) to the lever (101) is located.

The data communication and electric power supply cable (15) to route between the processing means (20) and the manual movement lever (101), in the present embodiment a multi-wired flat cable (15), starts from the area (13) where the processing means (20), in this embodiment, and typically, programmable processing microchips which allow providing the tap (100) with all the options of operation, reception and management of information and the desired electric power supply of the electronic elements (102, 103) of the handle, are located.

In its passage towards the lever (101), in the present embodiment, the cable (15) exits the dry area where the processing means (20) are located, to go through the outside of the cartridge (10) in a recess (16) of the body (11) wherethrough its position is fixed in the recess by means of retention elements (17).

The cable (15) reaches the upper area (14) of the cartridge (10) wherein it enters a space (19) by way of circular ring, wherein 2.25 turns are wound in spiral form (21) of cable (15) to provide the routing with an accumulation of extra length of said cable (15). In the inlet point to the space (19) and prior to the formation of the spiral (21), the inlet of the cable (15) is performed through a groove, the length of the segment between the processing means (20) and the spiral (21) being fixed by the retention elements (17) and the inlet groove.

The spiral (21) is not tensioned between the different concentric turns of cable (15), allowing the contraction of said spiral (21) and its expansion to allow the release or collection of cable (15) with the movement of the lever (101) whereto it is connected, through the outlet (22) wherein the cable (15) displaces solidly joined to the rotation parts (25) fixed by a fixing element (24).

The connection to the lever (101) is performed previously having a fold (23) in the cable (15) which allows the release or collection of cable in the direction that follows the vertical plane of inclination of the lever (101) for the typical regulation of the water intake flow performed by the user.

Alternatively to the configuration of the previous embodiment, it is possible to perform a routing of the cable (15) through the inside of the cartridge (10) or through closed channels through it (10) or adjacently, it also being possible to have a protective encapsulation to protect the cable (15) from contacts with the water and mechanical parts of the tap that may be damaged during their assembly.

Also alternatively, the cable (15) may be of different sections and number of wires, to adapt to embodiments where the electronic functions of the lever (101), that may be simply of signal lighting or complemented with data display or even, as in the previous embodiment, have touch configuration of different regulations, acoustic signals or other means such as biometric sensors, etc.

Another alternative to the previous embodiment allows the connection of the lever (101) with an outer element or device of the tap (100), said cable (15) starting from an outer element or device, instead of the processing means, but that, with the cable (15) entering through the cartridge, it must traverse it to reach said lever (101).

The tap (100), which in the previous embodiment is of external mixing by electronic means, may be alternatively performed by an internal mixing of the cartridge mechanically.

Despite the fact that reference has been made to a specific embodiment of the invention, it is evident for a person skilled in the art that the tap cartridge with cable routing for manual moving actuation handle and tap with electronic control that contains said cartridge is susceptible to numerous variations and modifications and that all the details mentioned can be replaced by other technically equivalent ones, without departing from the scope of protection defined by the attached claims

What is claimed is:

1. A tap cartridge with cable routing, which is configured to be coupled to a rotating tap with manual actuation handle or lever with electronic functions of control, configuration, display and/or generation of acoustic signals, characterized in that the tap cartridge has at least one cable routing formed by cable guiding passages, to guide it from an inlet or starting connection of said cable in the cartridge to its connection with the handle or lever of the tap that contains it, wherein the cable routing has:
a passage that traverses the cartridge until an area close to the connection with the handle or lever,
an accumulation space for a first additional length of cable located at the area close to the connection with the handle or lever has,
the first additional length of cable configured in spiral form within said accumulation space, before the connection of the cable with the handle or lever, having an extra length in the possible rotation of the handle or lever in either direction, retention elements of the cable immediately prior located to the cable accumulation of the first additional length of cable in spiral form, fixing a length of a cable segment prior to said cable in spiral form, fixing means of the cable to rotation elements of the handle or lever located after the cable accumulation of the first additional length of cable, wherein fixing means of the cable rotate with said handle or lever, a second additional length of cable in a multiple folding form, located after fixing means of the cable to rotation elements of the handle or lever and prior to the connection of the cable with the handle or lever, having an extra length in the possible displacement in the inclination plane of the handle or lever, and wherein the space provided for the accumulation of the first additional length of cable in spiral form is sufficient to contain said first additional length of cable in spiral form, and sufficient not to press each turn of the cable on the adjacent turns or against the inner and/or outer limits of the space where the first additional length of cable in spiral form is located when the handle or lever is rotating.

2. The tap cartridge, according to claim 1, wherein the passage that traverses the cartridge is performed over outside parts of the cartridge in a grooved manner.

3. The tap cartridge, according to claim 1, wherein the passage that traverses the cartridge is performed, at least partly, through inside parts of the cartridge.

4. The tap cartridge, according to claim 1, wherein the retention of the cable in its routing prior to the accumulation space, is performed by the retention elements of securing and the passages towards the inside of the accumulation space without the need to have a specific prior retention means of the cable.

5. The tap cartridge, according to claim 1, wherein the cable is of a flat multi-wired type or of circular section, said cable being able to have data transfer and/or electric power supply.

6. The tap cartridge, according to claim 1, wherein the cable starts from an inner processing means in the cartridge.

7. The tap cartridge, according to claim 1, wherein the cable has its connection in the cartridge by means of adhesive or similar in, at least, fixed routing segments which do not correspond to the accumulation in spiral form.

8. A tap with electronic control, characterized in that the tap has electronic functions of control-configuration, display and/or acoustic signals at least in the handle or lever which is of manual and rotating actuation and wherein the tap contains a tap cartridge with cable routing as indicated in claim 1.

\* \* \* \* \*